(12) United States Patent
Jung

(10) Patent No.: US 7,702,505 B2
(45) Date of Patent: Apr. 20, 2010

(54) CHANNEL NORMALIZATION APPARATUS AND METHOD FOR ROBUST SPEECH RECOGNITION

(75) Inventor: Ho-Young Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1021 days.

(21) Appl. No.: 11/300,223

(22) Filed: Dec. 14, 2005

(65) Prior Publication Data

US 2006/0129391 A1      Jun. 15, 2006

(30) Foreign Application Priority Data

Dec. 14, 2004   (KR) ...................... 10-2004-0105509
May 3, 2005     (KR) ...................... 10-2005-0037094

(51) Int. Cl.
*G10L 19/14* (2006.01)
(52) U.S. Cl. ...................................... 704/234
(58) Field of Classification Search .................. 704/234
See application file for complete search history.

(56) References Cited

U.S. PATENT DOCUMENTS

| 5,583,961 | A | * | 12/1996 | Pawlewski et al. | .......... 704/241 |
| 5,590,242 | A | | 12/1996 | Juang et al. | |
| 6,456,697 | B1 | | 9/2002 | Chang et al. | |
| 6,839,669 | B1 | * | 1/2005 | Gould et al. | ................ 704/246 |
| 2003/0014248 | A1 | * | 1/2003 | Vetter | .......................... 704/226 |
| 2005/0182621 | A1 | * | 8/2005 | Zlokarnik et al. | ........... 704/224 |

OTHER PUBLICATIONS

Vetter et al., Single channel speech enhancement using principle component analysis and MDL subspace selection, 1999, Signal Processing Laboratory, 4 pages.*

* cited by examiner

*Primary Examiner*—David R Hudspeth
*Assistant Examiner*—Jakieda R Jackson
(74) *Attorney, Agent, or Firm*—Ladas & Parry LLP

(57) ABSTRACT

A channel normalization apparatus includes: a characteristic extraction unit extracting MFCC characteristics and outputting rows of frames according to time; a characteristic parameter average calculation unit calculating an average value of the rows of the outputted MFCC characteristics; a channel variation estimation unit configuring a codebook based on a database of speech signals with attenuated channel variations and estimating a channel variation for each frame by calculating a distance between a MFCC parameter for each frame and an individual median value of the codebook when a MFCC of a channel distorted speech signal is inputted; and a smoothing operation based channel normalization unit smoothing another average value of the channel variation from the characteristic parameter average calculation unit and the channel variation from the channel variation estimation unit, subtracting the other average value from the MFCC of each frame and outputting rows of channel normalized MFCC characteristics.

12 Claims, 3 Drawing Sheets

CHANNEL NORMALIZATION APPARATUS AND METHOD FOR ROBUST SPEECH RECOGNITION

BACKGROUND OF THE INVENTION

1. Field of the Invention

The present invention relates to a speech recognition technology, and more particularly, to an apparatus for normalizing a channel variation for robust speech recognition, wherein the channel variation is generally caused by various factors including different microphone types and variations in communications systems, and a method therefore.

2. Description of the Related Art

Generally, as illustrated in FIG. 4, a speech recognition apparatus includes a characteristic extraction unit 10 and a speech recognition unit 20. The characteristic extraction unit 10 extracts characteristics of an inputted speech signal. The speech recognition unit 20 recognizes a speech based on data related to the characteristics extracted from the characteristic extraction unit 10. Although the characteristic extraction unit 10 can be implemented based on various methods, a mel-frequency cepstrum coefficient (MFCC) method or a perceptual linear prediction cepstrum coefficient (PLPCC) method is mainly employed. A hidden markov model (HMM), a dynamic time warping (DTW) method and a neural network method are frequently employed for the speech recognition unit 20.

FIG. 5 illustrates an exemplary conventional characteristic extraction unit for extracting a speech characteristic based on the MFCC method. As illustrated, the characteristic extraction unit includes: a spectrum analysis unit 11; a filter bank unit 12; a logarithmic compression unit 13; a discrete cosine transformation unit 14. The spectrum analysis unit 11 extracts information on a frequency spectrum of a speech signal. The filter bank unit 12 estimates an envelope curve of a simplified spectrum from the spectrum estimated by the spectrum analysis unit 11. The logarithmic compression unit 13 implies the size of the simplified spectrum based on a logarithmic function. The discrete cosine transformation unit 14 performs a discrete cosine transformation (DCT) operation to an output of the logarithmic compression unit 13 and calculating a cepstrum coefficient.

A channel variation typically occurs in a speech signal due to differences in microphone types, telephone networks and communication systems and personal variations. A cepstral mean subtraction (CMS) method, a signal bias removal (SBR) method and an affine transform of cepstrum (ATC) method are commonly known methods for compensating the channel variation. Due to a limitation in an amount of computation, most of the introduced channel variation compensation methods, which can improve a speech recognition function by compensating the channel variation, are not applied to a speech recognition signal but to a specific characteristic parameter for each time period after extracting characteristics.

On the basis of the fact that a channel variation is expressed as one constant in a mel-frequency cepstral coefficient (MFCC) region, which is a representative speech characteristic, the most widely employed method is the cepstral mean subtraction (CMS) method that calculates an average value of MFCC parameters for each time period and subtract the calculated average value from each MFCC parameter. Although this CMS method is simple and effective, there is a limitation in that the individual MFCC parameter can be viewed as a channel variation in respect of each time period. Also, the CMS method may result in a removal of a speech component for recognition.

In more detail of the CMS method, since the overall average value of the MFCC parameters is subtracted from the MFCC parameters, the individual MFCC parameter can be often viewed as a channel variation. For instance, in the case that a signal expressed as 'sin(t)+a' is changed into a signal expressed as 'sin(t)+a+b' due to a channel variation, the application of the CMS method causes a removal of an average value of 'a+b', thereby outputting a value of 'sin(t)'.

SUMMARY OF THE INVENTION

Accordingly, the present invention is directed to a channel normalization apparatus and a method for robust speech recognition, which substantially obviates one or more problems due to limitations and disadvantages of the related art.

It is an object of the present invention to provide a channel normalization apparatus for robust speech recognition, which can deal with various channel variations robustly by estimating a channel variation for each time period; calculating an average value over the entire time period; and estimating a channel variation for each locutionary activity, and a method therefore.

It is another object of the present invention to provide a channel normalization apparatus for robust speech recognition, which can remove a channel variation for each locutionary activity by smoothing an average value of MFCC parameters used in a CMS method since an average value of channel variations for each time period can be sensitive to a short locutionary activity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a channel normalization apparatus for robust speech recognition, including: a characteristic extraction unit extracting mel-frequency cepstrum coefficient (MFCC) characteristics and outputting rows of frames according to time; a characteristic parameter average calculation unit calculating an average value of the rows of the outputted MFCC characteristics; a channel variation estimation unit for each frame configuring a codebook based on a database of speech signals with attenuated channel variations and estimating a channel variation for each frame by calculating a distance between a MFCC parameter for each frame and an individual median value of the codebook when a MFCC of a channel distorted speech signal is inputted; and a smoothing operation based channel normalization unit performing a smoothing operation to another average value of the channel variation obtained from the characteristic parameter average calculation unit and the channel variation for each frame obtained from the channel variation estimation unit, subtracting the other average value from the MFCC of each frame, and outputting rows of channel normalized MFCC characteristics.

In another aspect of the present invention, there is provided a channel normalization method for robust speech recognition, including the steps of: extracting mel-frequency cepstrum coefficient (MFCC) characteristics of an inputted speech signal with an attenuated channel variation and configuring a codebook with a certain size; calculating distances, each between an MFCC of each frame for each time period and an individual median value of the codebook to estimate each of the calculated distances as the channel variation for each frame; calculating an average value of the rows of the MFCC characteristics for the inputted speech signal; and performing a smoothing operation to another average value of the channel variation based on the average value and the estimated channel variation for each time period, subtracting the other average value from the MFCC of each frame and outputting rows of channel normalized MFCC characteristics.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

As described previously, the conventional CMS method is simple and effective. However, there is a limitation in that the individual MFCC parameter can be viewed as a channel variation for each time period. Also, the CMS method may result in a removal of a speech component for recognition. Since the overall average value of the MFCC parameters is subtracted from the MFCC parameters, each MFCC parameter can be often viewed as a channel variation. For instance, in the case that a signal expressed as 'sin(t)+a' is changed into a signal expressed as 'sin(t)+a+b' due to a channel variation, the application of the CMS method causes a removal of an average value of 'a+b', thereby outputting a value of 'sin(t)'.

One proposed method to resolve the above limitation is a channel normalization method that estimates a channel variation value for each time period, calculates an average value of the estimated channel variation values, and subtracts the calculated average value from the target parameters, e.g., MFCC parameters. The channel variation estimation for each time period can be obtained through sequential operations including: extracting MFCC characteristics of an inputted speech signal with an attenuated channel variation; configuring a codebook with a certain size; calculating distances, each between an individual MFCC of the inputted speech signal for each time period and an individual median value of the codebook; assuming that the median value with the closest distance value represents the MFCC characteristic at the current time and estimating the distance as a channel variation at the corresponding time; and averaging the channel variation values, each calculated for each time period, over the entire locutionary activity and applying the averaged channel variation value for the channel normalization.

According to an exemplary embodiment of the present invention, a channel normalization method, which can deal with various channel variations robustly by configuring a codebook, which is a basis for a channel normalization operation, based on a principle component analysis (PCA) instead of a conventional vector quantization method, is suggested. Since an average value of channel variation for each time period can be sensitive to a short locutionary activity, smoothing an average value of MFCC parameters used in the CMS method can remove a channel variation for each locutionary activity.

Figure 1:
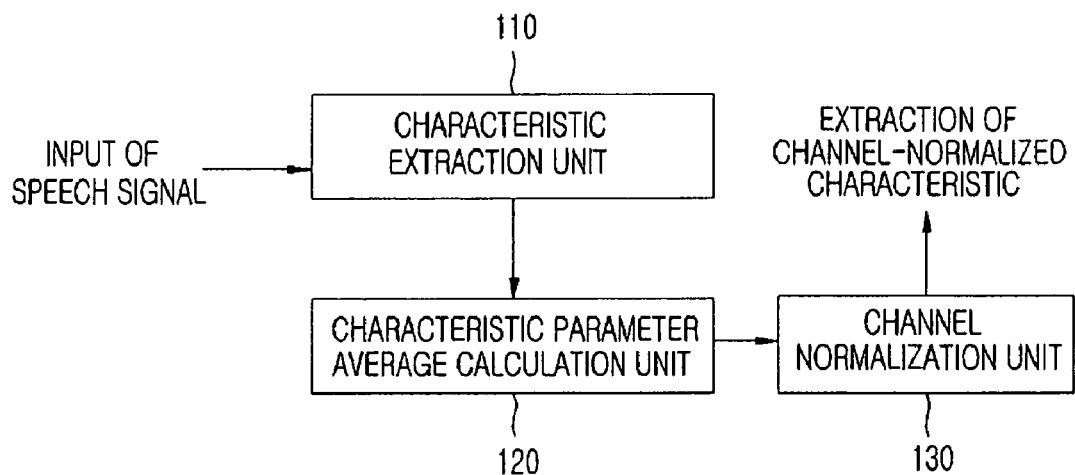
FIG. 1 is a block diagram illustrating a commonly used CMS-based channel normalization apparatus.

FIG. 1 is a block diagram illustrating a commonly used CMS-based channel normalization apparatus. The CMS-based channel normalization apparatus includes: a characteristic extraction unit 110; a characteristic parameter average calculation unit 120; and a channel normalization unit 130. The characteristic extraction unit 110 extracts MFCC characteristics representative for speech recognition and outputting rows of frames according to time. The characteristic parameter average calculation unit 120 calculates an average value of the rows of the outputted MFCC characteristics. The channel normalization unit 130 subtracts the calculated average value from the MFCC characteristic for each frame and outputs rows of channel normalized MFCC characteristics. This CMS-based channel normalization method can be expressed as follows.

$$b = \frac{1}{T}\sum_{t=1}^{T} C_t \qquad \text{Eq. 1}$$

$$\hat{C}_t = C_t - b \qquad \text{Eq. 2}$$

Herein, 'b', '$C_t$', 'T', and '$\hat{C}_t$' express a constant representing a channel variation, a MFCC parameter before the channel normalization at a frame 't', the number of frames with respect to an inputted locutionary activity, and a channel normalized MFCC parameter at the frame 't', respectively. According to the CMS-based channel normalization method, the MFCC parameter for each frame becomes a channel variation for each frame. Thus, there is a high risk that the channel variation can include a speech component.

One exemplary embodiment of the present invention introduces a method to resolve the above limitation in the channel variation determination. According to the exemplary embodiment, the introduced method includes: configuring a codebook based on a database of speech signals with attenuated channel variations; calculating a distance between a MFCC parameter for each frame and an individual median value of the codebook; and estimating the distance as a channel variation for each frame. On the basis of the codebook with respect to the speech signals with the attenuated channel variations, a distance that moves an inputted speech signal with a channel distortion to the closest median value within the codebook is estimated as a channel variation value. This introduced method according to the exemplary embodiment of the present invention can be defined as follows.

$$b_t = C_t - \min_i \arg D(C_t, cordword_i) \quad \text{Eq. 3}$$

$$b = \frac{1}{T}\sum_{t=1}^{T} b_t \quad \text{Eq. 4}$$

Herein, '$b_t$', 'D', '$cordword_i$' and 'b' express an estimated channel variation value with respect to a frame 't', a distance between the MFCC parameter and each median value 'codeword' of the codebook, an 'i'th median value of the codebook, and an estimated channel variation value with respect to the whole locutionary activity, respectively. Being different from the conventional CMS-based channel normalization method, the channel variation value at each frame 't' is not the MFCC parameter but the estimated channel variation value '$b_t$', and subtracting an average value of the estimated channel variation values can minimize a loss of the speech component.

One critical part of the above introduced channel normalization method is a method of configuring the basis codebook. Since the codebook is used to estimate a degree of variation in an inputted speech signal with a channel variation, the codebook has a great effect on a function. The conventional vector quantization method for configuring the codebook relies largely on a database (DB) employed to configure the codebook and thus, the conventional vector quantization method has a difficulty in dealing with various channel variations. In more detail, since the vector quantization method can have a bias in a certain direction since the vector quantization method divides the entire DB into an intended number of clusters and calculates a median value based on an average value of each cluster.

However, according to the exemplary embodiment of the present invention, several axes that construct the entire characteristic vector for configuring the codebook are extracted to be used as median values. In general, the MFCC characteristic comprises approximately the $13^{th}$ vector, and a principle component analysis (PCA) method is employ to extract 'N' number of main axial components. Typically, the number of main axial components, i.e., 'N', for resolving the channel variation limitation is less than approximately the $13^{th}$ order by being in a range of approximately 8 to approximately 10.

Another important factor in the exemplary embodiment of the present invention is a smoothing operation applied to the above equation 2 in the case of calculating a channel variation value with respect to the entire locutionary activity as defined in the above equation 4. The extraction of the channel characteristic according to the above equation 4 is effective; however, there may be a disadvantage that the extraction is too sensitive when a length of the locutionary activity is short. Hence, the smoothing operation is performed and can be expressed as follows.

$$b = \frac{1}{2}\left[\frac{1}{T}\sum_{t=1}^{T} b_t + \frac{1}{T}\sum_{t=1}^{T} C_t\right] \quad \text{Eq. 5}$$

As depicted in the above equation 5, an average value of the channel variation value from the conventional CMS method and the channel variation for each time period are subjected to the smoothing operation.

Figure 2:
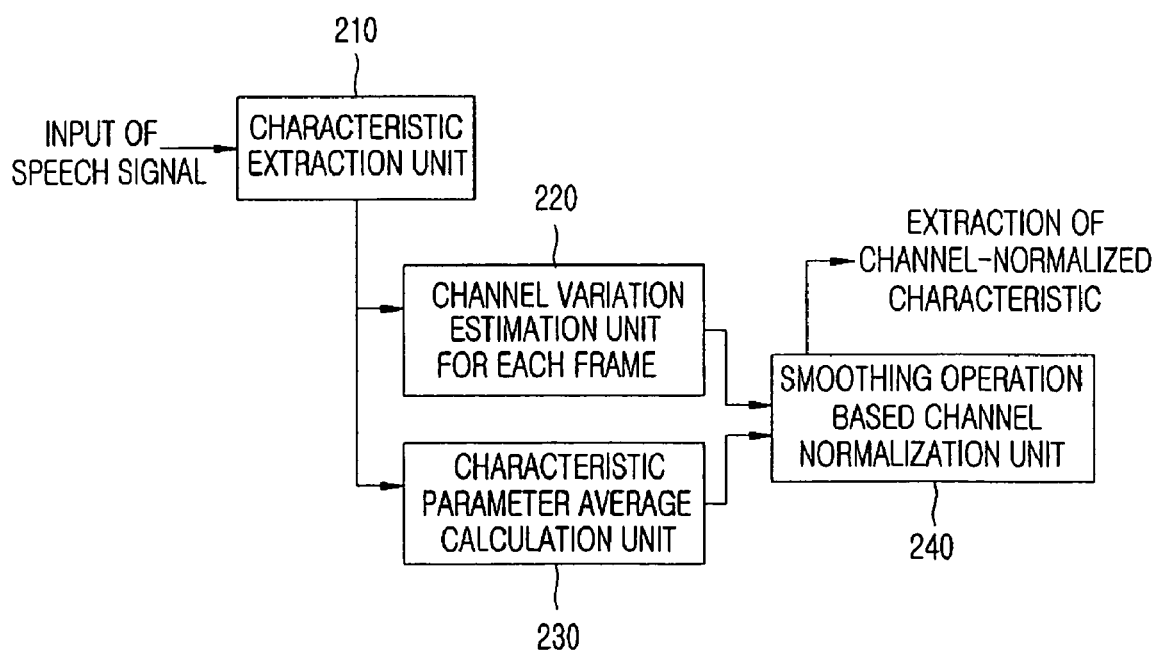
FIG. 2 is a block diagram illustrating a channel normalization apparatus in accordance with a first embodiment of the present invention.

FIG. 2 is a block diagram illustrating a channel normalization apparatus in accordance with a first embodiment of the present invention. The channel normalization apparatus includes: a characteristic extraction unit 210; a channel variation estimation unit 220 for each frame; a characteristic parameter average calculation unit 230; and a smoothing operation based channel normalization unit 240. The characteristic extraction unit 210 and the characteristic parameter average calculation unit 230 serve the same functions as described in FIG. 1. The channel variation estimation unit 220 for each frame executes the functions defined by the equations 3 and 4, while the smoothing operation based channel normalization unit 240 performs the function defined by the equation 5.

The channel normalization method described in FIG. 2 may have a delay in constructing a system since the normalization takes place after receiving the speech signal completely. Thus, according to other exemplary embodiment of the present invention, the method renews a channel variation value continuously from a previous locutionary activity at an environment using a speech recognition system and applies the renewed channel variation value to a currently inputted locutionary activity, and the channel variation value obtained from the currently inputted locutionary activity is used to renew the channel variation value for the next locutionary activity.

Figure 3:
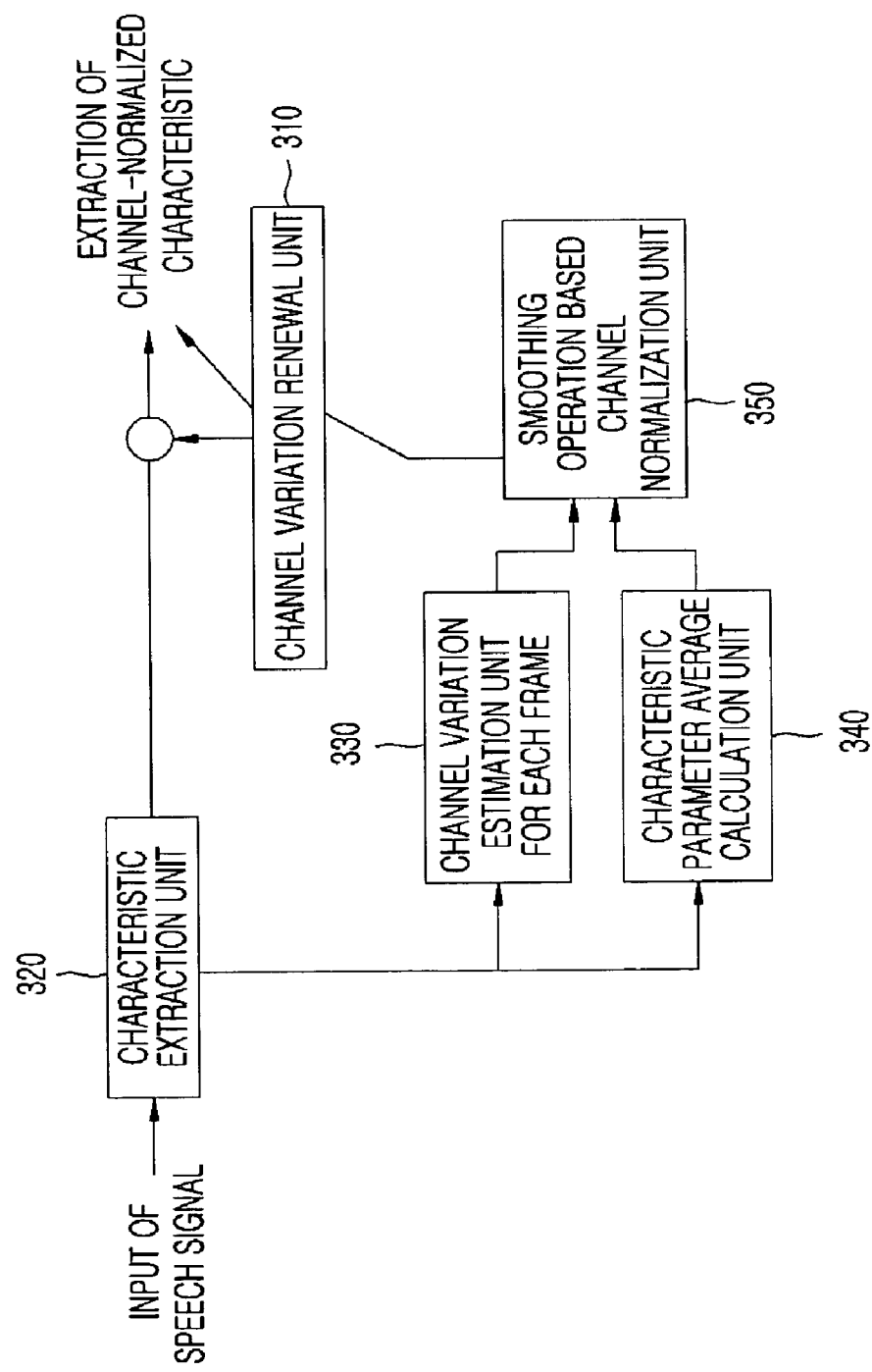
FIG. 3 is a block diagram illustrating a channel normalization apparatus in accordance with a second embodiment of the present invention.
Figure 4:
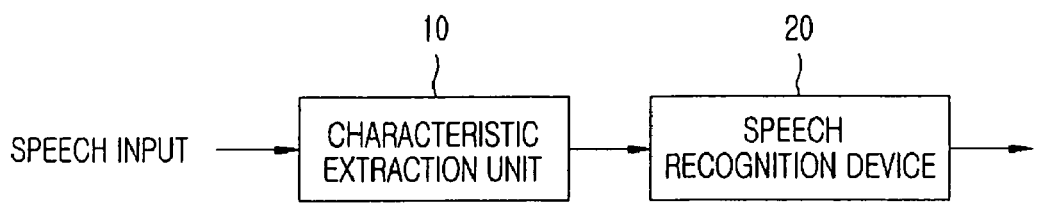
FIG. 4 is a diagram schematically illustrating a conventional speech recognition system.
Figure 5:
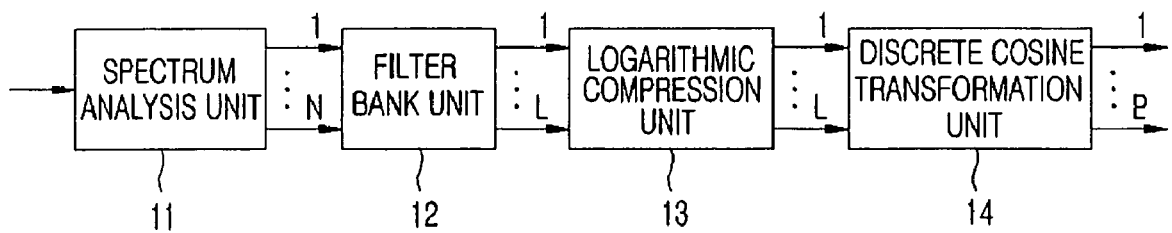
FIG. 5 is a block diagram illustrating an exemplary characteristic extraction unit illustrated in FIG. 4.

FIG. 3 is a block diagram illustrating a channel normalization apparatus for processing the channel normalization method described in FIG. 2 in real-time in accordance with a second embodiment of the present invention. The channel normalization apparatus includes: a characteristic extraction unit 320; a channel variation estimation unit 330 for each frame; a characteristic parameter average calculation unit 340; a smoothing operation based channel normalization unit 350; and a channel variation renewal unit 310.

The currently inputted speech signal is normalized using a channel variation value provided from a channel variation renewal unit 310. Simultaneously, the currently inputted speech signal passes through a channel variation estimation unit 330 for each frame, a characteristic parameter average calculation unit 340, a smoothing operation based channel normalization unit 350 and provides an estimated channel variation value from the channel variation renewal unit 310 for the next locutionary activity. The channel normalization apparatus which can process the channel normalization in real-time can be useful in an on-line speech recognition system such as Internet.

The exemplary embodiments of the present invention reveal the channel normalization methods for attaining stable performance of a speech recognition system. Especially, it is expected that the exemplary normalization methods contribute to an improvement on recognition in telephone networks.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A channel normalization apparatus for robust speech recognition, comprising:
   a characteristic extraction unit extracting mel-frequency cepstrum coefficient (MFCC) characteristics from a received input speech signal, and
   wherein the extracted MFCC characteristics for a frame of the receive input speech signal is output in rows of the frames according to time;

a characteristic parameter average calculation unit calculating an average value of the rows of the outputted MFCC characteristics;

a channel variation estimation unit for each frame, wherein a codebook of MFCC characteristics are configured from a database of speech signals with attenuated channel variations and estimating a channel variation for each frame by calculating a distance between a MFCC parameter for each frame and a median value of the codebook when a MFCC parameter is generated of a channel having a distorted input speech signal; and a smoothing operation based channel normalization unit configured to perform a smoothing operation to a second average value of the channel variation obtained from the characteristic parameter average calculation unit and the channel variation for each frame obtained from the channel variation estimation unit, subtracting the second average value from the MFCC value of each frame, and outputting rows of channel normalized MFCC characteristics.

2. The channel normalization apparatus of claim 1, wherein the codebook is configured based on a principle component analysis (PCA) method.

3. The channel normalization apparatus of claim 2, wherein the codebook based on the PCA method is set to have approximately 8 to 10 median values.

4. The channel normalization apparatus of claim 1, further comprising a channel variation renewal unit for processing a channel normalization operation in real-time, the channel variation renewal unit normalizing a currently inputted locutionary activity based on a channel variation estimation value obtained from a previous locutionary activity; and continuously renewing an estimated channel variation value of the currently inputted locutionary activity and the previously obtained channel variation estimation value for a next locutionary activity.

5. The channel normalization apparatus of claim 4, wherein the real-time channel normalization apparatus is implemented to an on-line speech recognition system.

6. The channel normalization apparatus of claim 1, wherein the characteristic extraction unit comprises:

a spectrum analysis unit extracting information on a frequency spectrum of a speech signal;

a filter bank unit estimating an envelope curve of a spectrum simplified from the spectrum estimated by the spectrum analysis unit;

a logarithmic compression unit implying the size of the simplified spectrum based on a logarithmic function; and a discrete cosine transformation unit performing a discrete cosine transformation (DCT) operation to an output of the logarithmic compression unit to estimate a cepstrum coefficient.

7. A channel normalization method for robust speech recognition, comprising:

extracting mel-frequency cepstrum coefficient (MFCC) characteristics of an inputted speech signal with an attenuated channel variation and configuring a codebook of MFCC characteristics from a database of speech signal with a certain size;

calculating distances between an MFCC of each frame for each time period and an individual median value of the codebook to estimate each of the calculated distances, which is the channel variation for each frame;

calculating an average value of the rows of the MFCC characteristics for the inputted speech signal; and performing a smoothing operation to a second average value of the channel variation based on the average value and the estimated channel variation for each time period, subtracting the second average value from the MFCC of each frame and outputting rows of channel normalized MFCC characteristics.

8. The channel normalization method of claim 7, wherein the codebook is configured based on a principle component analysis (PCA) method.

9. The channel normalization method of claim 8, wherein the codebook based on the PCA method is set to have approximately 8 to 10 median values.

10. The channel normalization method of claim 7, further comprising:

normalizing a currently inputted locutionary activity based on a channel variation estimation value obtained from a previous locutionary activity; and continuously renewing an estimated channel variation value of the currently inputted locutionary activity and the previously obtained channel variation estimation value for a next locutionary activity, wherein the channel normalization method processes a channel normalization operation in real-time.

11. The channel normalization method of claim 7, wherein at the calculating the distances to estimate the channel variation for each frame, the channel variation is estimated by the following equation:

$$b_t = C_t - \min_i \arg D(C_t, cordword_i)$$

where '$b_t$', 'D', '$cordword_i$' and 'b' express an estimated channel variation value with respect to a frame 't', a distance between the MFCC parameter and each median value 'codeword' of the codebook, and an 'i'th median value of the codebook, respectively.

12. The channel normalization method of claim 7, wherein at the performing the smoothing operation, the channel variation is calculated based on the following equation:

$$b = \frac{1}{2}\left[\frac{1}{T}\sum_{t=1}^{T} b_t + \frac{1}{T}\sum_{t=1}^{T} C_t\right]$$

where 'b', '$C_t$', 'T', and '$b_t$' express a constant representing a channel variation, a MFCC parameter before the channel normalization at a frame 't', the number of frames with respect to an inputted locutionary activity, and an estimated channel variation value with respect to a frame 't', respectively.

* * * * *